US007032822B2

(12) United States Patent
Waters

(10) Patent No.: US 7,032,822 B2
(45) Date of Patent: Apr. 25, 2006

(54) MEMORY TAG, READ/WRITE DEVICE AND METHOD OF OPERATING A MEMORY TAG

(75) Inventor: John Deryk Waters, Bath (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 193 days.

(21) Appl. No.: 10/697,268

(22) Filed: Oct. 31, 2003

(65) Prior Publication Data

US 2004/0100834 A1 May 27, 2004

(51) Int. Cl.
*G06K 7/10* (2006.01)

(52) U.S. Cl. ...................... 235/454; 235/453; 235/440; 235/492; 235/487; 235/436

(58) Field of Classification Search ................ 235/454, 235/440, 492, 487, 436; 343/771, 814, 816, 343/820, 857

See application file for complete search history.

(56) References Cited

U.S. PATENT DOCUMENTS

| | | | | |
|---|---|---|---|---|
| 4,992,648 | A * | 2/1991 | Hutchison | 235/379 |
| 5,300,765 | A * | 4/1994 | Mizuta | 235/492 |
| 6,320,169 | B1 * | 11/2001 | Clothier | 219/626 |
| 6,376,040 | B1 * | 4/2002 | Usami | 428/64.4 |
| 6,394,347 | B1 * | 5/2002 | Kitai et al. | 235/440 |
| 2002/0008632 | A1 * | 1/2002 | Clothier | 340/825.37 |

FOREIGN PATENT DOCUMENTS

| | | | |
|---|---|---|---|
| EP | 0392731 | A2 | 10/1990 |
| FR | 2670642 | A2 * | 6/1992 |
| JP | 363012080 | A * | 1/1988 |
| JP | 405274495 | A * | 10/1993 |
| WO | WO01/95242 | A2 | 12/2001 |
| WO | WO 02/075645 | | 9/2002 |

OTHER PUBLICATIONS

Gilbert, Ronald et al. (WO 01/95242 A2), Remote Communication System and Method, Dec. 13, 2001.*

* cited by examiner

*Primary Examiner*—Karl D. Frech
*Assistant Examiner*—Kimberly D. Nguyen
(74) *Attorney, Agent, or Firm*—Foley & Lardner LLP

(57) ABSTRACT

A memory tag has a non-volatile memory in which in use data is stored, an antenna coil and power supply circuit such that in use the memory tag is powered by inductive coupling. The memory tag also has a sensor for receipt of transmitted light carrying input signals and a processor for processing of the received input signals, and a modulation circuit for overlay of output signals onto the power supply circuit. A read/write device, for communication with the memory tag has a signal generator, an antenna coil and a power supply circuit for powering the memory tag in use by inductive coupling. The read/write device further includes a light emitter for emission of the light carrying the input signals to the memory tag, and a demodulation circuit for retrieval of the output signals from the inductive coupling.

11 Claims, 1 Drawing Sheet

MEMORY TAG, READ/WRITE DEVICE AND METHOD OF OPERATING A MEMORY TAG

FIELD OF THE INVENTION

The invention relates to a memory tag which is powered and communicated with wirelessly, and in particular to such a memory tag which is powered by inductive coupling.

BACKGROUND OF THE INVENTION

Radio Frequency Identification, or RFID, memory tags are known in many different forms for different applications. However, they all have in common a non-volatile memory, which in use stores data, and a transponder including an antenna coil for (wireless) inductive coupling with a transceiver. The memory tag is powered as a result of the inductive coupling, and is also read from or written to as a result of the inductive coupling. Different forms of RFID memory tag achieve the read/write communication in different ways, such as by amplitude modulation of the radio frequency signal, or by phase or frequency modulation. More detail of RFID memory tags can be obtained from the RFID Handbook, Klaus Finkenzeller, 1999, John Wiley & Sons.

Opto-electronic memory tags are also known, with one example being described in U.S. Pat. No. 6,299,068 B1. Such devices include a non-volatile memory which in use stores data and opto-electric cells which intercept light directed at the tag. The light powers the tag circuitry but is also modulated to provide data for writing to the tag memory and/or control signals to enable reading from the tag memory.

Using the same electromagnetic signals, whether radio frequency or light, for both supplying power and communication can be problematic, as the transmission of data or control signals can lead to inconsistent power supply, or consistent power supply can lead to inconsistent communication.

SUMMARY OF THE INVENTION

According to a first aspect of the invention there is provided a memory tag having a non-volatile memory in which in use data is stored, an antenna coil and power supply circuit such that in use the memory tag is powered by inductive coupling, wherein the memory tag also includes a sensor for receipt of transmitted light carrying input signals and a processor for processing of the received input signals, and a modulation circuit for overlay of output signals onto the power supply circuit.

The memory tag may operate such that output signals are sent via the inductive coupling in response to input signals received optically.

The input signals may be data and/or control signals, and the output signals may be indicative of the data stored in the memory.

Conveniently the processor of the memory tag further controls the memory and the sensor.

The sensor may be a CMOS light sensor, and the light emitter is conveniently a light emitting diode.

Preferably the memory tag is implemented on single semiconductor chip.

According to a second aspect of the invention there is provided read/write device, for communication with a memory tag according to the first aspect of the invention, having a signal generator, an antenna coil and a power supply circuit for powering the memory tag in use by inductive coupling, and wherein the read/write device further includes a light emitter for emission of the light carrying the input signals to the memory tag, and a demodulation circuit for retrieval of the output signals from the inductive coupling.

The read/write device may further include a sensor for receipt of transmitted light carrying output signals from the memory tag.

Typically the read/write device further includes a processor for control of the light emitter, and of the sensor where appropriate.

According to a third aspect of the invention there is provided a method of operating a wireless memory tag comprising powering the memory tag by inductive coupling and communicating with the memory tag by transmitting control and/or data signals to the memory tag using optical signals and receiving output signals from the memory tag as modulation of the inductive coupling.

The method may further comprise communicating with the memory tag by receiving data signals from it using optical signals.

BRIEF DESCRIPTION OF THE DRAWINGS

Embodiments of memory tags according to the invention will now be described, by way of example only, by reference to the accompanying drawings in which.

DETAILED DESCRIPTION OF THE PREFERRED EMBODIMENTS

Figure 1:
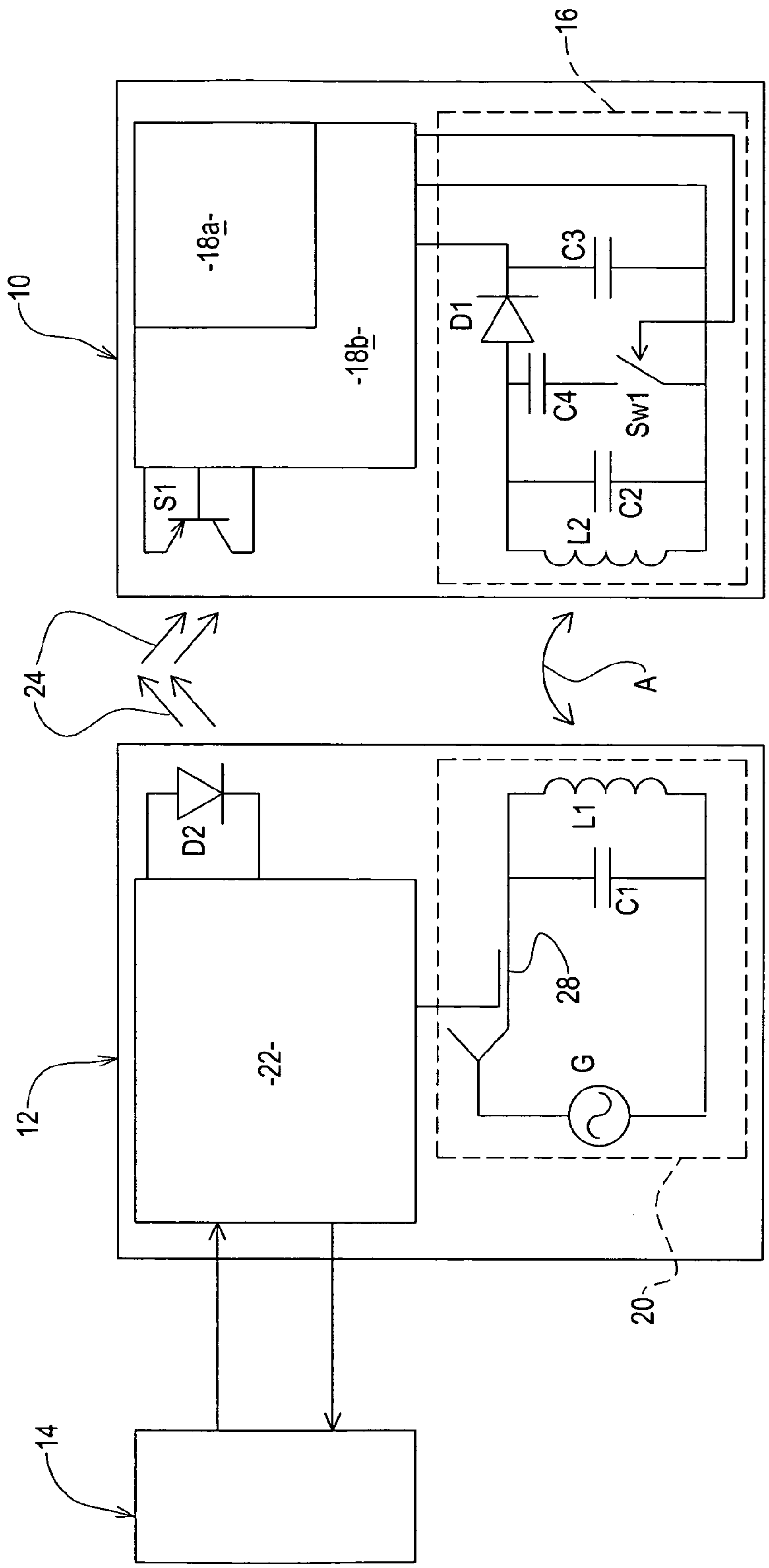
FIG. 1 is a schematic of an embodiment of a memory tag according to the invention and of a read/write device for communication therewith.

Referring to FIG. 1 a memory tag 10, read/write device 12 and host computer 14 are illustrated schematically, using the following notation for the various circuit components; C-capacitor, L-inductor, D-diode, S-sensor, G-generator and Sw-switch.

The memory tag 10 includes a power supply circuit 16, a memory 18*a* and processor 18*b*, and sensor S1. The power supply circuit 16 includes an inductor L2 and a capacitor C2, the values of which are selected to tune the combination to 2.45 GHz for inductive coupling, illustrated by double headed arrow A, with the read/write device 12 as discussed below, and a diode D1 and a capacitor C3 which rectify the induced current to provide a direct current (DC) power supply to the memory and processor 18. The power supply circuit 16 further includes a switching capacitor C4 and a switch Sw1 which are used to overlay output signals onto the 2.45 GHz signal.

The read/write device 12 includes a power supply circuit 20, a processor 22, and a light emitting diode D3. The power supply circuit 20 includes a radio frequency generator G, and inductor L1, a capacitor C1 and a coupler 28. The generator G operates at 2.45 GHz and the values of components L1 and C1 are selected to tune the combination to that frequency.

The read/write device 12 is connected to a host computer 14 which provides the appropriate control signals to the processor 22.

The memory tag 10 is powered by inductive coupling between the power supply circuit 20 of the read/write device 12 and the power supply circuit 16 of the memory tag 10, in the manner known in the prior art of RFID memory tags. However, communication between the memory tag 10 and the read/write device 12 is not all achieved by inductive coupling as is the case in the prior art, but rather some is now by optical means.

When the read/write device 12 is to communicate with the memory tag 10 the processor 22 causes the light emitting diode D2 to operate such that it emits light 24, the output being amplitude modulated with the required data and/or control signals. The amplitude modulation can be achieved simply by switching the light emitting diode D2 on and off such that it emits pulses of light. The emitted light 24 is received by sensor S1, which is conveniently a photo-transistor, on the memory tag 10. The resistance of the photo-transistor S1 varies with the intensity of light falling on it, and thus when a voltage is applied across it that variation in resistance can be detected. Thus the input signals to the memory tag 10, being data and/or control signals, which are carried by the light are deciphered by the processor 18*b*, and where appropriate passed to the memory 18*a* for storage.

Communication of output signals from the memory tag 10 to the read/write device 12 is achieved as in the prior art of RFID memory tags by inductive coupling. Thus data read from the memory 18*a* of the memory tag 10 is overlaid on the 2.45 GHz signal by switching capacitor C4 in and out of the power supply circuit 16 using switch Sw1. In the read/write device 12 the power supply circuit 20 is modified to deal with the receipt of the data signal from the memory tag 10. Coupler 28 is used to divide the received signal from the 2.45 GHz signal and the signal is then passed to the processor 22. A splitter may also be included in the power supply circuit 20 of the read/write device 12 in order to provide the processor with a sample of the 2.45 GHz signal for comparing with the received signal, in known manner.

The memory tag 10 and read/write device 12 provide an advantage, as the communication to and from the memory tag 10 is by different frequencies sufficiently far apart for interference not to occur, such that the communication in the two directions can take place simultaneously without the need for multiplexing.

The memory tag 10 may each be implemented on a single CMOS (Complimentary Metal-Oxide-Semiconductor) integrated circuit to operate at the frequency indicated above, 2.45 GHz. CMOS technology will now permit the integration of sensors such as S1 onto CMOS integrated circuits and using Si—SiGe Quantum Dot technology light sources can also be provided in this way. Thus the memory tag 10 can be a completely wireless single chip implementation.

Embodiments of memory tags according to the invention need not be implemented in CMOS technology, nor on a single chip, if the application for which it is designed does not require that level of miniaturisation.

The invention claim is:

1. A memory tag comprising:

a non-volatile memory in which in use data is stored;

an antenna coil and power supply circuit configured such that in use the memory tag is powered by inductive coupling;

a sensor for receipt of transmitted light carrying input signals;

a modulation circuit for overlay of output signals onto the power supply circuit; and a processor for processing of the received input signals and the output signals.

2. A memory tag according to claim 1 wherein output signals are sent via the inductive coupling in response to input signals received optically.

3. A memory tag according to claim 1 wherein the input signals are data and/or control signals.

4. A memory tag according to claim 1 wherein the output signals are indicative of the data stored in the memory.

5. A memory tag according to claim 1 wherein the processor further controls the memory and the sensor.

6. A memory tag according to claim 1 wherein the sensor is a CMOS light sensor.

7. A memory tag according to claim 6 wherein the memory tag is implemented on a single semiconductor chip.

8. A read/write device, for communication with a memory tag according to claim 1, having a signal generator, an antenna coil and a power supply circuit for powering the memory tag in use by inductive coupling, and wherein the read/write device further includes a light emitter for emission of the light carrying the input signals to the memory tag, and a demodulation circuit for retrieval of the output signals from the inductive coupling.

9. A read/write device according to claim 8 wherein it further includes a processor for control of the light emitter.

10. A method of operating a wireless memory tag comprising:

powering the memory tag by inductive coupling; and transmitting control and/or data signals to the memory tag using optical signals;

receiving output signals from the memory tag as modulation of the inductive coupling; and processing both the input signals and the output signals by a processor of the memory tag.

11. A memory tag comprising:

a non-volatile memory in which in use data is stored;

an antenna coil and power supply circuit configured such that in use the memory tag is powered by inductive coupling;

a sensor for receipt of transmitted light carrying input signals;

a modulation circuit for overlay of output signals onto the power supply circuit; and a processor for processing of the received input signals.

* * * * *